Nov. 22, 1966     D. D. RAMAKER     3,286,781
ARTICULATED VEHICLE WITH PIVOTABLE FRAME STEERING
Filed Feb. 2, 1965     2 Sheets-Sheet 1
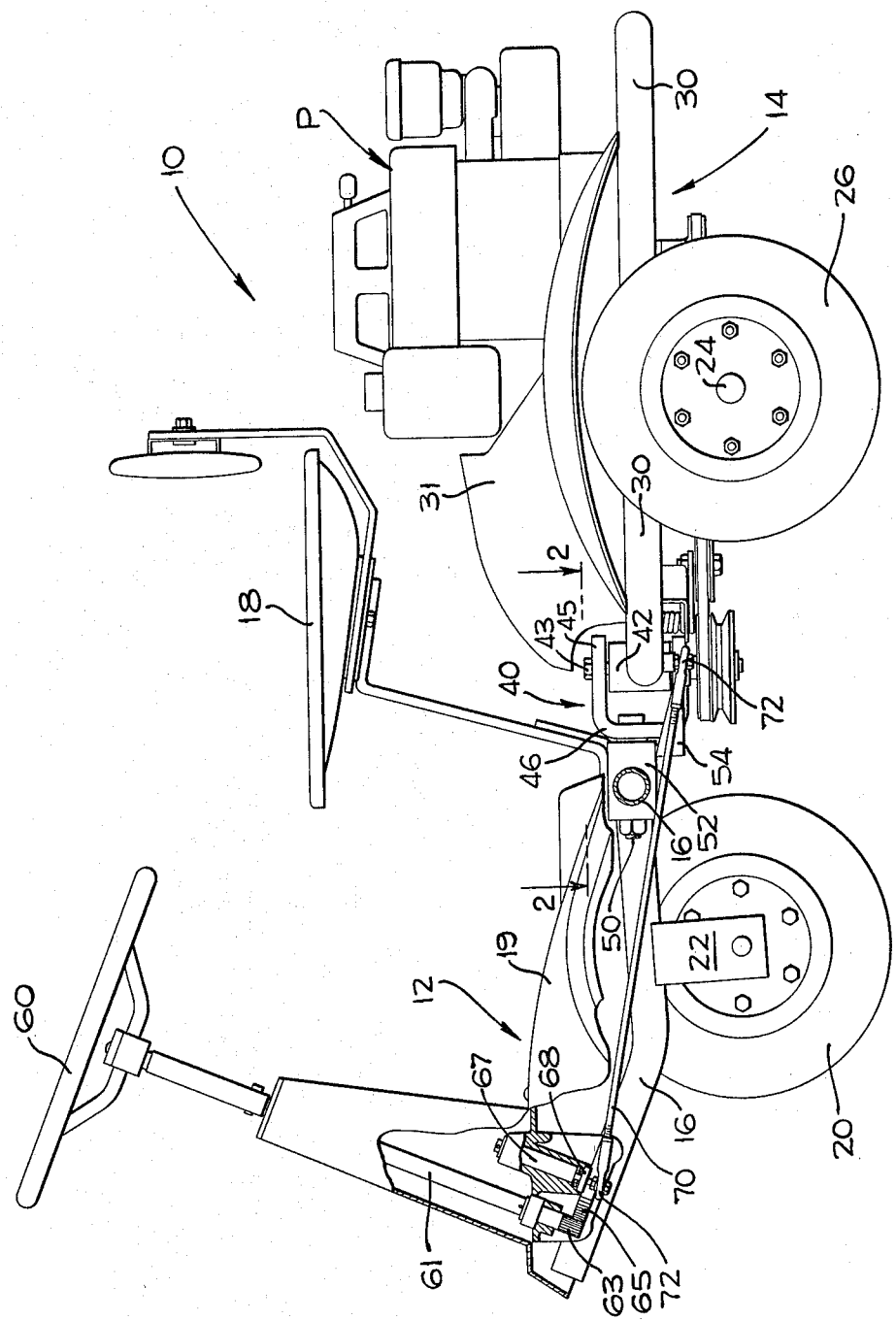
INVENTOR
DUDLEY D. RAMAKER
BY
ATTORNEY

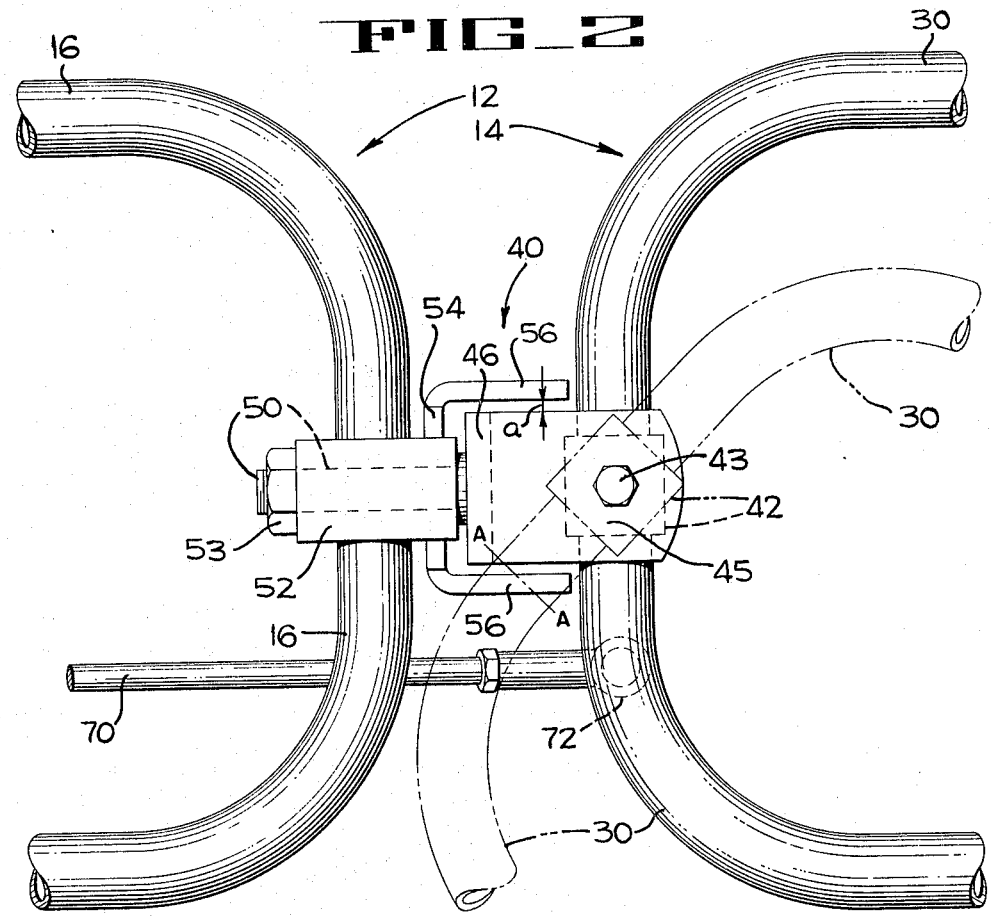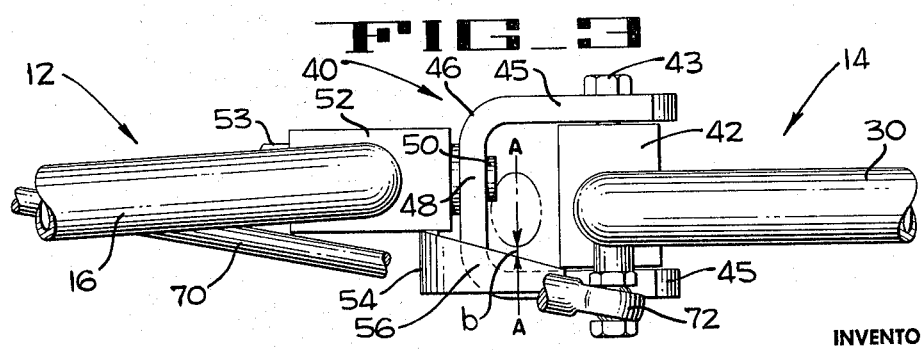

United States Patent Office 3,286,781
Patented Nov. 22, 1966

3,286,781
ARTICULATED VEHICLE WITH PIVOTABLE
FRAME STEERING
Dudley D. Ramaker, Cedar Grove, Wis., assignor to FMC Corporation, San Jose, Calif., a corporation of Delaware
Filed Feb. 2, 1965, Ser. No. 429,812
4 Claims. (Cl. 180—52)

The present invention pertains to an articulated vehicle with pivotable frame steering, and more particularly to an articulated vehicle comprising a two-wheeled power unit and a two-wheeled riding unit, which units are coupled at approximately the midpoint between the two sets of wheels in a manner permitting relative rotation of the units about both vertical and horizontal axes.

The design and building of small tractor-like vehicles has long presented certain problems. These vehicles, which are commonly designed for performing small tasks about the home and garden such as lawn cutting, snow removal, and the like, usually are molded after a large, conventional tractors or other heavy duty equipment. However, one of the most desired characteristics of these smaller vehicles is that they be highly maneuverable since they are generally operated within specific, limited areas. This characteristic is not usually found in the larger vehicles and, therefore, most of the lightweight low-power vehicles in use today are not provided with an optimum design in view of their ultimate use.

The vehicle of the present invention departs from the traditional low power vehicle concepts and utilizes a two-piece frame having a pivot connection at the center of the vehicle joining the two otherwise independent sections of the frame. This pivot connection permits relative pivotal movement of the frame sections about both a vertical axis and longitudinal horizontal axis. The rearward frame section is the power section supplying the driving power for the vehicle, while the forward frame section is adapted to carry the driver of the vehicle as well as the operative implement which the vehicle is designed to use, for example, a power mower. The steering is effected by changing the angle, in a horizontal plane, between the frame sections. That is to say, when the vehicle is to be turned, the front or riding section is pivoted in its entirety relative to the rear frame section instead of merely pivoting the wheels as with a conventional steering mechanism. The advantage of such a method of steering is that the maneuverability and steering response of the vehicle is greatly increased whereby the vehicle can be made to perform quick and tight turns, closely circle objects such as trees and small shrubs, and maneuver into otherwise inaccessible areas with relative ease. Furthermore, the permissible independent oscillation of each of the frame sections about a longitudinal horizontal axis provides greater stability for the vehicle and permits all four wheels to be retained on the ground regardless of the roughness or unevenness of the terrain.

It is, therefore, an object of the present invention to provide a vehicle having a pivotable frame type of steering, which is highly maneuverable and stable when operating upon a rough or uneven ground surface.

Another object of the present invention is to provide a two-section vehicle in which a quick response in steering is achieved by causing one section of the vehicle to be pivoted relative to the other about a vertical axis while said sections remain free to pivot relative to each other about the horizontal axis running longitudinally of the vehicle.

Another object of the present invention is to provide an articulated vehicle having front and rear sections which are designed for relative pivotal movement about both a vertical axis and a longitudinal horizontal axis and whereby the independent movement of the sections about the horizontal axis is limited by the degree of relative pivotable movement about the vertical axis so that the vehicle is maintained in a stable position when it is turned in the horizontal plane.

Another object of the present invention is to provide a pivotable connection for permitting relative pivotable movement about both vertical and horizontal axes but which both progressively and proportionately limits the pivotable movement about the horizontal axis during relative pivotable movement about the vertical axis.

Other objects and advantages of the present invention will become apparent from the following description and the accompanying drawings in which:

FIGURE 1 is a side elevation of the vehicle of the present invention with a portion thereof being broken away for the purpose of illustration.

FIGURE 2 is an enlarged plan of a portion of the vehicle, the view being taken looking in the direction of arrows 2—2 of FIG. 1 and particularly showing the pivotal connection between the front and rear sections of the vehicle, and with a second, pivoted position of the vehicle sections being shown in phantom lines.

FIGURE 3 is a side elevation of the pivotal connection shown in FIGURE 2, a section of the rear frame being shown in phantom lines in its relatively pivoted position.

Referring now more particularly to the drawings, FIGURE 1 shows an articulated vehicle 10 comprised of a front frame section 12 and a rear frame section 14. The front frame section includes a tubular frame member 16 upon which is mounted a seat 18 for the operator of the vehicle and a housing 19 enclosing the frame member. Frame member 16 also serves to mount a pair of front wheels 20 (only one of which is shown in FIG. 1) by means of wheel spindles 22 extended from the sides of the frame member.

The rear frame section 14 contains a power unit P which acts through a rear axle 24 to drive a set of rear wheels 26 during the operation of the vehicle. This power unit includes a gasoline engine, transmission, differential, and rear axle drive mechanism, all of which are conventional in design and are interconnected in the conventional manner to provide a ready source of power for the rear wheels 26. Since the details of these elements are not critical to an understanding of the present invention, they will not be further described.

The rear frame section also includes a tubular cylindrical frame member 30 which serves to mount the power unit P and the rear wheels 26. Secured to the upper portion of the frame member 30 is a housing 31 covering the forward portion of the rear frame section.

During operation of the vehicle, the driver sits in the seat 18, attached to the front frame section while the vehicle is propelled through the power unit P on the rear frame section. Since the frame sections are independent, the driver is substantially isolated from the vibrations as well as the noise and fumes of the engine while he operates the vehicle. The front frame section 12 is adapted to carry an operative implement, such as a power mower attachment, for example. By means of a two-way pivotal connection 40 connecting the rear power and driving section 14 with the front frame section 12, the operator of the vehicle is permitted to maneuver the operative implement (not shown) with a considerable degree of control.

The present invention is primarily concerned with the construction and operation of the pivotal connection 40 connecting the front and rear frame sections of the vehicle. This connection, which is best shown in FIGURES 2 and 3, includes a block 42 which is mounted centrally of the forward portion of the rear frame member 30 and which has a vertical passageway extending therethrough for the reception of a pivot bolt 43. The bolt 43 is fixed within the passageway through the block 42 but extends away from the block at its upper and lower ends so as to provide cylindrical bearing surfaces for the reception of the upper and lower ears 45 of a pivot yoke 46 that is connected to the front frame member 16. The flat vertically extending portion 48 of the pivot yoke between the two ears 45 rigidly mounts a horizontally extending bolt 50 that is pivotally mounted within a block 52 attached to the rearward central portion of the front frame member 16. A nut 53 is secured to the projecting end of the bolt 50 to prevent relative axial movement between the bolt and the front frame member and consequent separation of the two vehicle frame sections.

It can be seen, therefore, that the pivotal connection 40 allows for relative pivotal movement between the front and rear frame sections about both the vertical axis defined by bolt 43 and a horizontal axis provided by bolt 50. The frame sections are relatively pivoted about a vertical axis when the vehicle undergoes a turn, as the ears 45 of the pivot yoke 46 rotate about the vertical pivot bolt 43. Relative movement about the horizontal axis is permitted, as when one of the wheels 20 or 26 encounters an obstruction or a depression, by the permissible rotation of the horizontal bolt 50 of the pivot yoke within the block 52 on the front frame section.

An important feature of the present invention is the provision of a means for limiting the relative rotation between the front and rear frame sections of the vehicle about the horizontal axis of the bolt 50. This limiting of relative pivotal movement in the vertical plane becomes critical when the frame sections are in a relative pivoted position in the horizontal plane, such as shown by the position of the rear frame member 30 in FIGURE 2 in phantom lines, as when the vehicle is negotiating a turn. During a turn, there is a natural tendency for the rear driving section of the vehicle to continue in a forward direction and thus overturn the front section of the vehicle by tipping it towards the outside of the turn. If unlimited relative horizontal pivoting movement is permitted during this time, there is the possibility that the front frame section could become relatively rotated towards the outside of the turn, as for example when the front wheel 20 on the outside of the turn is in a depression, whereby the tendency to overturn will be accentuated.

In order to limit horizontal movement, a U-shaped member 54 is welded or otherwise rigidly attached to the lower surface of the block 52 on the front frame section. This member includes a pair of longitudinally tapered flanges 56 which project rearwardly adjacent the lower ear 45 of the pivot yoke 46. During normal travel when the vehicles are aligned and there is no relative pivotal movement about the vertical axis of pivot pin 43 (full lines in FIG. 2), relative pivotal movement about the horizontal axis is limited by the arcuate distance between the lowermost ear 45 and the side of the flange 56. This distance is marked "a" in FIGURE 2. As the frame sections are relatively rotated, the rear frame member 30 will move into a position overlying one of the flanges 56 as shown in phantom lines in FIGURE 2. It is to be noted that FIGURE 3 shows a projection in phantom lines, marked A—A, which is a projection of a section through the part of the rear frame member 30 of FIGURE 2, similarly marked A—A, which overlies the flange 56 in its relatively pivoted position. The maximum permissible horizontal rotation of the rear frame section about the front frame section is limited by the distance between the lowermost surface of the rear frame member 30 and the uppermost surface of the flange 56 on the inside of the turn, this distance being marked "b" in FIGURE 3. It can be seen that as the frame sections are relatively pivoted more and more about the vertical axis, the bottom edge of the frame member 30 will move closer and closer to the upper edge of the flange 56. Thus, the distance "b" representing the maximum permissible relative rotation between the frame sections about the axis of bolt 50 in one direction will progressively decrease, and the permissible relative movement of the front frame section towards the outside of the turn, or relative movement of the rear frame section towards the inside of the turn, will be progressively decreased. Eventually, if the turn is made sharp enough, the rear frame member 30 will move into engagement with the flange 56, and relative pivotal movement about the horizontal axis will be entirely prevented in one direction.

The vehicle is controlled and steered by the operator by changing the angle between the front and rear frame sections about the vertical axis of pivot bolt 43. In order to accomplish this, the operator manipulates a steering wheel 60 to which is attached a steering shaft 61 extending through the housing 19 at the forward portion of the front frame section. The steering shaft 61 is rotatably mounted in the housing 19 and includes, at its lowermost end a splined portion 63 that is adapted to mate with corresponding splines on a steering gear 65. The steering gear 65 is pivotally mounted within the housing 19 by means of a shaft 67 so that it may rotate with a limited amount of pivotal movement as the steering wheel 60 is turned by the operator. The steering gear 65 has attached thereto a flat flange 68 which projects outwardly therefrom to connect with the steering rod 70 which joins the front and rear frame sections. The steering rod is a rigid member that is connected to both the flange 68 on the steering gear 65 and to the rear frame member 30 by means of ball-type swivel connections 72 which permit angular adjustment of the rod. When the operator wishes to steer the vehicle 10, he rotates the steering wheel 60 and in so doing causes rotation of the steering gear 65 about the axis of the shaft 67. This motion is transmitted to the steering rod 70 through the flange 68 and, hence, the steering rod is either moved forwardly or rearwardly with respect to the rear frame section. The force of the steering rod between the front and rear frame sections causes the vehicle to be pivoted on the vertical pivot axis provided by the pivot bolt 43. It is to be noted that the pivot bolt 43 is located at approximately the exact mid-point between the rear axle 24 and the axis of the front wheels 20. This is the ideal position for the vertical pivot axis as it permits the rear wheels to exactly track the front wheels during a turn.

It can be seen from the foregoing description that the vehicle of the present invention is especially suited for the quick maneuverability and steering control needed for small jobs about the garden and estate because of its articulated structure and its frame type of steering. Since the two sections of the vehicle are capable of relative rotation in two different directions or planes, the vehicle is especially suitable for operation over rough and uneven ground. For example, when the front frame section carries an operative implement such as a power mower, the mower will maintain its position as controlled by the front wheels 20 and will not be disturbed by the riding condition of the rear frame section. Furthermore, safety is built into the vehicle since a means is provided whereby the relative horizontal pivotal movement which might tend to upset the vehicle will be increasingly and proportionately controlled during a turning movement of the vehicle when the frame sections are relatively pivoted about the vertical axis.

While but one embodiment of the present invention has been shown and described it will be understood that various changes and modifications may be made therein without departing from the spirit of the invention or the scope of the appended claims.

The invention having thus been described, what is believed to be new and desired to be protected by Letters Patent is:

1. An articulated vehicle comprising a two-wheeled front section and a rear pushing section, a joint connecting said sections for relative pivotal movement of said sections in a horizontal plane about a vertical axis and for pivotal movement of one section relative to the other about a longitudinal horizontal axis, an abutment member fixed to one of said sections including a projection extending toward the other of said sections, said projection having an upwardly facing abutment surface which is slanted in the vertical direction and which is arranged to be contacted by a portion of said other of said sections when said sections are relatively rotated about the horizontal axis, the point of contact between said abutment surface and said other section being dependent upon the relative angle between said sections in the horizontal plane whereby the amount of permissible relative pivotal movement between said sections in one direction about said horizontal axis is progressively decreased as said angle between said sections in the horizontal plane is decreased.

2. An articulated vehicle comprising a two-wheeled front section and a rear pushing section, a joint connecting said sections for relative pivotal movement of said sections in a horizontal plane about a vertical axis and for pivotal movement of one section relative to the other about a longitudinal horizontal axis, an abutment member fixed to one of said sections and having a pair of parallel legs projecting toward the other of said sections on opposite sides of said joint, each of said legs being provided with upwardly facing abutment surfaces which are slanted in the vertical direction, one of said abutment surfaces being contacted by a portion of said other of said sections when the sections are relatively rotated about said horizontal axis in one direction, the point of contact between said one abutment surface and said other section being dependent upon the relative angle between the sections in the horizontal plane whereby the amount of permissible relative pivotal movement between said sections in one direction about said horizontal axis is progressively decreased as said angle between said sections in the horizontal plane is decreased.

3. An articulated vehicle comprising a two-wheeled front riding section and a two-wheeled rear driving section, a joint connecting said sections for relative pivotal movement of said sections in a horizontal plane about a vertical axis and for pivotal movement of one section relative to the other about a longitudinal horizontal axis, a rigid member further interconnecting said sections and having a movable coupling with one of said sections which when moved causes relative pivotal movement between said sections about said vertical axis in order to steer the vehicle, an abutment member fixed to one of said sections including a projection extending toward the other of said sections, said projection having an upwardly facing abutment surface which is slanted in the vertical direction and which is arranged to be contacted by a portion of said other of said sections when said sections are relatively rotated about the horizontal axis, the point of contact between said abutment surface and said other section being dependent upon the relative angle between said sections in the horizontal plane whereby the amount of permissible relative pivotal movement between said sections in one direction about said horizontal axis is progressively decreased as said angle between said sections in the horizontal plane is decreased.

4. An articulated vehicle comprising a two-wheeled front riding section and a two-wheeled rear driving section, each of said sections including a frame, a joint interconnecting said frames, said joint including a member journalled for relative pivotal movement about both a vertical axis and a longitudinal horizontal axis, a U-shaped member attached to one of said frames and having a leg extending toward the other frame on each side of said joint, each of said legs tapering toward said other frame so as to provide an upper abutment surface which is slanted in the vertical direction, the abutment surfaces of said legs being in a position to limit the amount of relative pivotal movement between said sections of the vehicle about the horizontal axis when said sections are relatively pivoted about said vertical axis by engagement with a portion of said other frame.

References Cited by the Examiner
UNITED STATES PATENTS

| 1,340,169 | 5/1920 | Jessen | 180—52 |
| 2,701,616 | 2/1955 | Cooper | 180—52 X |
| 2,765,861 | 10/1956 | Ekas | 180—52 X |
| 2,796,140 | 6/1957 | Knolle | 180—52 X |
| 3,159,229 | 12/1964 | Thwaites | 180—51 |
| 3,189,117 | 6/1965 | Ammon | 180—51 |

FOREIGN PATENTS

| 723,103 | 2/1955 | Great Britain. |
| 840,263 | 7/1960 | Great Britain. |

A. HARRY LEVY, *Primary Examiner.*